(12) United States Patent
Goujon et al.

(10) Patent No.: US 9,182,512 B2
(45) Date of Patent: Nov. 10, 2015

(54) PROCESSING MULTI-COMPONENT SEISMIC DATA

(75) Inventors: Nicolas Goujon, Oslo (NO); Ahmet Kemal Ozdemir, Asker (NO); Oeyvind Teigen, Slependen (NO); Johan O. A. Robertsson, Grantchester (GB)

(73) Assignee: WESTERNGECO L.L.C., Houston, TX (US)

(*) Notice: Subject to any disclaimer, the term of this patent is extended or adjusted under 35 U.S.C. 154(b) by 865 days.

(21) Appl. No.: 13/281,433

(22) Filed: Oct. 26, 2011

(65) Prior Publication Data

US 2013/0107664 A1 May 2, 2013

(51) Int. Cl.
*G01V 1/38* (2006.01)
*G01V 1/36* (2006.01)

(52) U.S. Cl.
CPC ... *G01V 1/36* (2013.01); *G01V 1/38* (2013.01); *G01V 2210/32* (2013.01)

(58) Field of Classification Search
USPC .............................................. 367/19, 21, 24
See application file for complete search history.

(56) References Cited

U.S. PATENT DOCUMENTS

| 5,365,492 A | 11/1994 | Dragoset |
| 7,466,625 B2 | 12/2008 | Robertsson et al. |
| 2005/0013194 A1* | 1/2005 | Vaage et al. ........... 367/24 |
| 2008/0049551 A1* | 2/2008 | Muyzert et al. ........ 367/24 |
| 2009/0040872 A1 | 2/2009 | Pabon et al. |
| 2009/0238036 A1* | 9/2009 | Robertsson et al. ..... 367/24 |
| 2009/0323467 A1* | 12/2009 | Goujon et al. ......... 367/19 |
| 2011/0085413 A1* | 4/2011 | Keers et al. ........... 367/21 |

FOREIGN PATENT DOCUMENTS

GB 2450122 A 12/2008

OTHER PUBLICATIONS

Yen, , "On nonuniform sampling of bandwidth-limited signals", IRE Transaction on Circuit Theory, vol. 3, 1956, pp. 251-257.

* cited by examiner

*Primary Examiner* — Ian J Lobo

(57) ABSTRACT

A technique includes receiving first data indicative of a pressure measurement and measurements of components of a particle motion vector acquired by sensors disposed on at least one cable; and processing the first data to generate second data indicative of a constructed an in-line component of the particle motion vector. The technique includes processing the first and second data in a geophysical processing operation that relies on at least three components of the particle motion vector.

20 Claims, 4 Drawing Sheets

PROCESSING MULTI-COMPONENT SEISMIC DATA

BACKGROUND

The invention generally relates to processing multi-component seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving first data indicative of a pressure measurement and measurements of components of a particle motion vector acquired by sensors disposed on at least one cable; and processing the first data on a machine to generate second data indicative of a constructed an in-line component of the particle motion vector. The technique includes processing the first and second data in a geophysical processing operation that relies on three components of the particle motion vector.

In another embodiment of the invention, a system includes an interface to receive first data indicative of a pressure measurement and measurements of components of a particle motion vector acquired by sensors disposed on at least one cable. The system includes a processor to process the first data to reconstruct an in-line component of the particle motion vector based on the first data.

In yet another embodiment of the invention, an article includes a processor readable storage medium to store instructions that when executed by at least one processor cause the processor(s) to receive first data indicative of a pressure measurement and measurements of components of a particle motion vector acquired by sensors disposed on at least one cable; and process the first data to reconstruct an in-line component of the particle motion vector based on the first data.

Advantages and other features of the invention will become apparent from the following drawing, description and claims.

DETAILED DESCRIPTION

Figure 1:
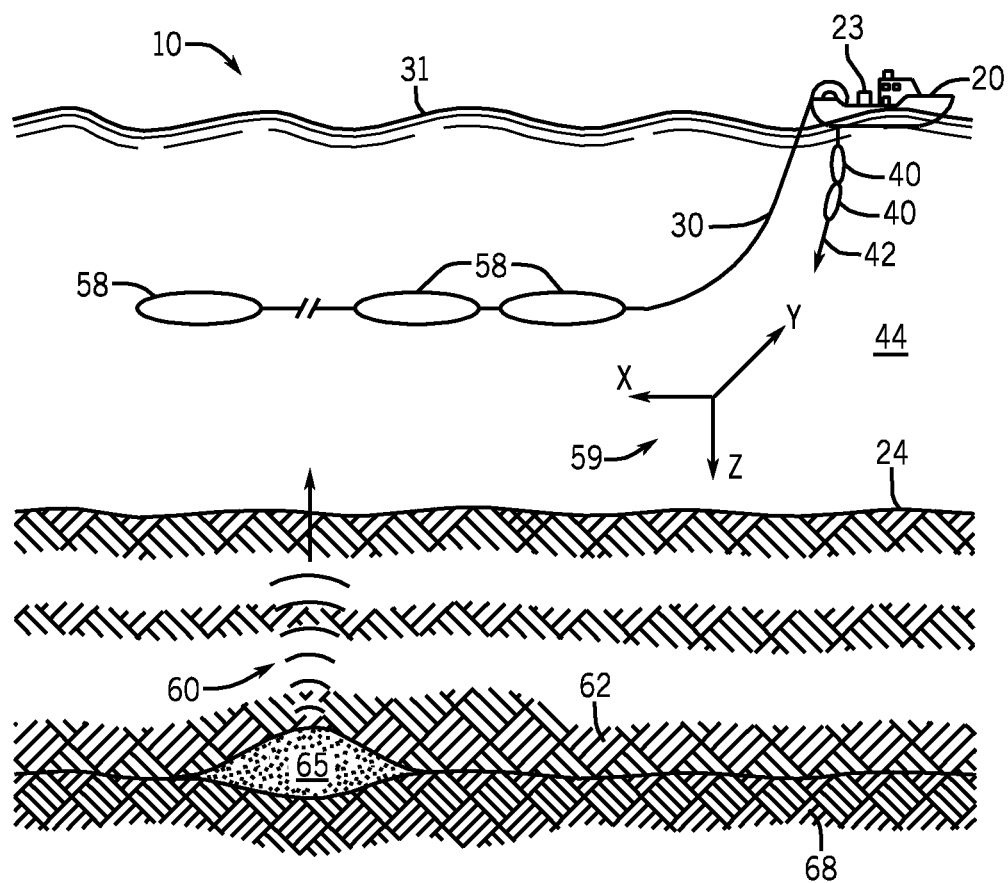
FIG. 1 is a schematic diagram of a seismic acquisition system according to an embodiment of the invention.

Seismic sensors may be deployed in cable in a number of different seismic data acquisition systems, such as in marine-based seismic data acquisition systems in which one or more seismic streamers are towed or seabed cables are positioned on the seabed; or in well-based seismic data acquisition systems in which one or more seismic sensor cables extend into a wellbore. As a non-limiting example, FIG. 1 depicts an exemplary marine-based, towed seismic data acquisition system 10, which includes a survey vessel 20 that tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which are constructed to acquire pressure data and particle motion data.

More specifically, for the reasons that are further described below, each streamer 30 may be a three component (3C) streamer, which has hydrophones to acquire pressure measurements and particle motion sensors to acquire measurements of the cross-line (y) and vertical (z) components of the particle motion vector, where "y" and "z" refer to the axes 59.

The marine seismic data acquisition system 10 further includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the seismic waves that are received and sensed by the seismic sensors 58 include "up going" seismic waves that propagate to the sensors 58 after reflections at the subsurface, as well as "down going" seismic waves that are produced by reflections of the pressure waves 60 from an air-water boundary, or free surface 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

A two component (2C) streamer contains pressure sensors that acquire pressure measurements and particle motion sensors that acquire measurements of the vertical component of the particle motion vector. Thus, ideally, the 2C streamer provides ghost free data, or the upgoing wavefield. However, to account for three-dimensional (3D) propagation effects, the sensor spacing may need to be relatively small to ensure that the acquired measurements are free from aliasing. Although time and the in-line coordinates may be relatively finely sampled in the acquisition, the cross-line coordinate may be non-uniformly sampled due to strong currents.

A four component (4C) streamer contains pressure sensors that acquire pressure measurements and particle motion sensors that acquire measurements of all three components of the particle motion vector. A 4C streamer therefore permits 3-D deghosting and cross-line reconstruction without making any assumptions on the wavefield or the subsurface. Moreover, the full three component particle acceleration vector may be used by geophysical processing algorithms, such as algorithms that perform polarization analysis, rotation of acquired particle motion data in the horizontal (x-y) plane, rotation of the acquired particle motion data in the vertical (y-z) plane, etc.

For purposes of simplifying the following the discussion, it is assumed that the particle motion vector is an acceleration vector. However, the particle motion vector may be, for example, a velocity vector, in accordance with other implementations.

The 4C streamer may be realized using four types of sensors: hydrophone sensors to acquire measurements of the pressure (called "P" herein); in-line particle motion sensors to acquire measurements of the in-line particle acceleration (called "$A_x$" herein); cross-line particle motion sensors to acquire measurements of the cross-line particle acceleration (called "$A_y$" herein); and vertical particle motion sensors to acquire measurements of the vertical component of the particle acceleration (called "$A_z$" herein). However, the quality of the in-line particle motion measurements (such as the in-line acceleration measurements $A_x$) within a sensor cable (e.g., a streamer cable) may be relatively poor. In this manner, the in-line stiffness of the cable may act as a mechanical filter, which filters the measurements of the in-line component of the particle motion vector, resulting in sub-optimal vector fidelity for the in-line component data. Moreover, vibration waves may propagate in the cable in the in-line direction, reducing the signal-to-noise ratio (SNR) of the data. As the vibrations propagate at velocities similar to the seismic wave velocity, the noise attributable to the vibrations may be relatively difficult to attenuate during processing of the in-line component data. It is noted that the hydrophones, which measure pressure and not vibration, may be relatively less sensitive to this type of noise.

Systems and techniques are disclosed herein for purposes of realizing a 4C set of measurements by only using three types of measurements received from the sensor cable (such as the streamers 30): pressure measurements P; cross-line partial acceleration measurements $A_y$; and vertical particle acceleration measurements $A_z$. The remaining in-line particle acceleration measurement $A_x$ is constructed from the other three measurements. Thus, depending on the particular embodiment of the invention, measurements acquired from a 3C streamer may be processed to construct the missing in-line component; or alternatively, a 4C streamer may be used, and a constructed in-line component may be substituted for the in-line particle motion component that is measured by the 4C streamer.

Figure 2:
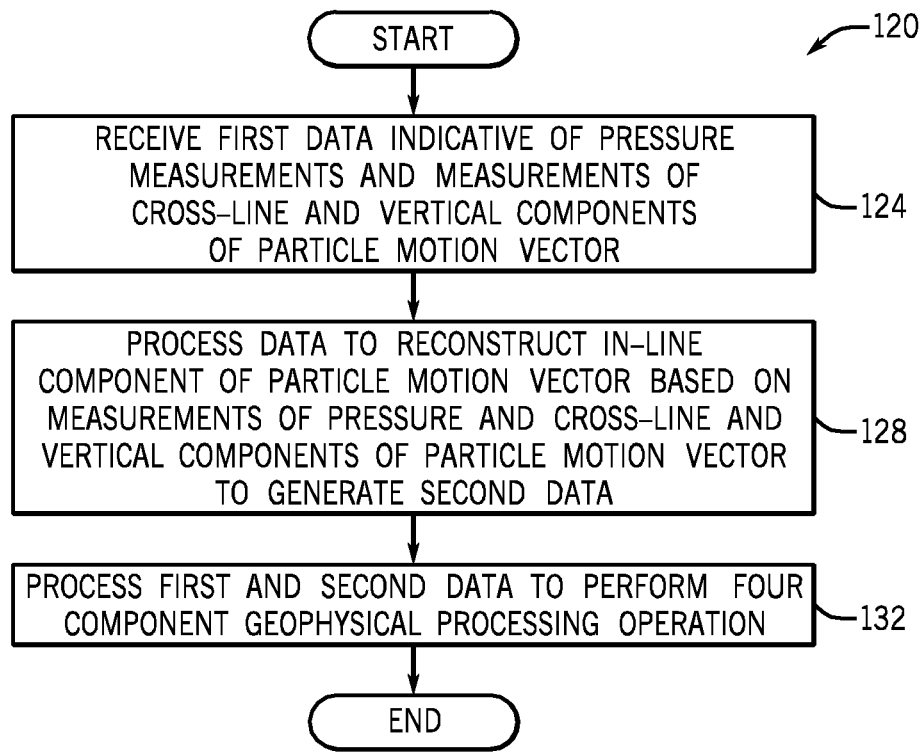
FIGS. 2, 3, 4, 5 and 6 are flow diagrams depicting techniques to construct an in-line component of a particle motion vector according to embodiments of the invention.

Referring to FIG. 2, in accordance with techniques and systems that are disclosed herein, a technique 120 includes receiving (block 124) first data indicative of pressure measurements and measurements of cross-line and vertical components of a particle motion vector. The technique includes processing the data (block 128) to reconstruct an in-line component of the particle motion vector based on the measurements of the pressure and cross-line and vertical components of the particle motion vector to generate second data. The first and second data may then be processed, pursuant to block 132, to perform a 4C-based geophysical processing operation.

More specifically, for the following discussion, it is assumed that the sensor-carrying cable, such as the streamer 30, is horizontal and aligned with the in-line axis (x axis, as depicted in FIG. 1). It is noted, however, that the techniques and systems that are disclosed herein may likewise be applied to cables that are aligned with other axes, such as the vertical (z) axis, etc. Thus, references to the crossline (y) and vertical (z) axes are merely used herein to simplify the following discussion, with it being understood that the systems and techniques that are disclosed herein may likewise be applied to, in general, constructing the in-line component of a three component particle motion vector using the pressure measurements and measurements of the other non-inline components of the particle motion vector, regardless of whether these other components are crossline and vertical components or not. Furthermore, the systems and techniques that are disclosed herein may be applied to measurements of particle motion vector components that are not orthogonal but are nevertheless indicative of two non-inline components of a three component particle motion vector. It is noted that any such non-orthogonal measurements may be projected/rotated onto an orthogonal set of axes if desired. It is also noted that the techniques and system that are disclosed herein may likewise be applied to cables other than streamer cables, such as, for example, a sensor cable that is deployed in a wellbore (a sensor cable used in a vertical seismic profile (VSP) or borehole seismic (BHS) system, for example) or on the seabed. Thus, the cable may be a static cable or may be a towed cable, depending on the particular implementation.

The particle motion vector is related to the spatial gradient of the pressure wavefield as follows:

$$\frac{\partial P}{\partial x} = \rho A_x, \qquad \text{Eq. 1}$$

$$\frac{\partial P}{\partial y} = \rho A_y, \text{ and} \qquad \text{Eq. 2}$$

$$\frac{\partial P}{\partial z} = \rho A_z, \qquad \text{Eq. 3}$$

where "$\rho$" represents the density of the fluid medium; "$A_x$" represents the in-line particle acceleration; "$A_y$" represents the cross-line particle acceleration; and "$A_z$" represents the vertical particle acceleration. From sampling theory, a seismic wavefield may be completely defined from its uniformly spaced samples acquired at the spatial Nyquist rate, which is twice the largest wavenumber in the wavefield.

Wave propagation theory constrains the frequency and the wavenumbers of a seismic wavefield as follows:

$$k_x^2 + k_y^2 + k_z^2 = f^2/c^2, \qquad \text{Eq. 4}$$

where "$k_x$" represents the in-line wavenumbers; "$k_y$" represents the cross-line wavenumber; "$k_z$" represents the vertical wavenumber; "f" represents the frequency of the wavefield; and "c" represents the acoustical speed of sound in the fluid medium. From the relationship that is set forth in Eq. 4, the maximum in-line wavenumber in the wavefield may be expressed as follows:

$$k_{x,MAX}(f) = f_{MAX}/c, \qquad \text{Eq. 5}$$

where "$f_{MAX}$" represents the maximum frequency of interest in the acquired seismic wavefield.

In seismic processing, the useful bandwidth of the wavefield in time is limited due to such factors as the attenuation of the earth, the existence of ambient noise, etc. For example, 120 Hertz (Hz) may be chosen as the maximum frequency of interest (called "$f_{MAX}$"), where the expected seismic signal level is considerably strong, as compared to ambient noise level. The acoustic speed of sound (c) is about 1,500 meters per second (m/s), when the fluid surrounding the streamer is water. It follows that the maximum wavenumber in the in-line direction is limited to $k_{x,MAX}(f) = 1/12.5$ 1/m, and the in-line spacing to acquire the unaliased pressure measurement in the inline direction is $\Delta x = 1/(2k_x, MAX) = 6.25$ m, where "$\Delta x$" represents the pressure sensor spacing. Therefore, a streamer that has uniformly spaced hydrophone sensors at a 6.25 m or shorter spacing allows the pressure wavefield to be reconstructed at any arbitrary in-line position without the aliased pressure wavefield being present in the sampled data. This reconstruction may be achieved by applying, for example, the Shannon interpolation formula, which is set forth below:

$$P(x) = \sum_{n=-\infty}^{\infty} P(n\Delta x) \text{sinc}(x/\Delta x - n), \qquad \text{Eq. 6}$$

where "P(x)" represents the pressure wavefield (as a function of in-line position "x"), and "sin c(x)" is "$\sin(\pi x)/(\pi x)$."

A convenient feature of the sampling theorem that is set forth in Eq. 6 is that the summation is uniformly convergent in x. This allows a term-by-term differentiation, which, in turn, permits the derivatives of the pressure P(x) to be derived. In general, the $r^{th}$ derivative of the pressure P(x) may be expressed as follows:

$$P^{(r)}(x) = \sum_{n=-\infty}^{\infty} P(n\Delta x) \frac{d^r}{dx^r} \text{sinc}(x/\Delta x - n). \qquad \text{Eq. 7}$$

For the first derivative of P(x), in which r=1, the following reconstruction formula may be derived:

$$\frac{\partial P(x)}{\partial x} = \frac{1}{\Delta x} \sum_{n=-\infty}^{\infty} P(n\Delta x) \left\{ \frac{\cos(\pi(x/\Delta x - n))}{x/\Delta x - n} - \frac{\sin(\pi(x/\Delta x - n))}{\pi(x/\Delta x - n)^2} \right\}. \qquad \text{Eq. 8}$$

By combining Eqs. 1 and 8, the particle acceleration in the in-line direction may be described as follows:

$$A_x(x) = \frac{1}{\rho \Delta x} \sum_{n=-\infty}^{\infty} P(n\Delta x) \left\{ \frac{\cos(\pi(x/\Delta x - n))}{x/\Delta x - n} - \frac{\sin(\pi(x/\Delta x - n))}{\pi(x/\Delta x - n)^2} \right\}. \qquad \text{Eq. 9}$$

Figure 3:
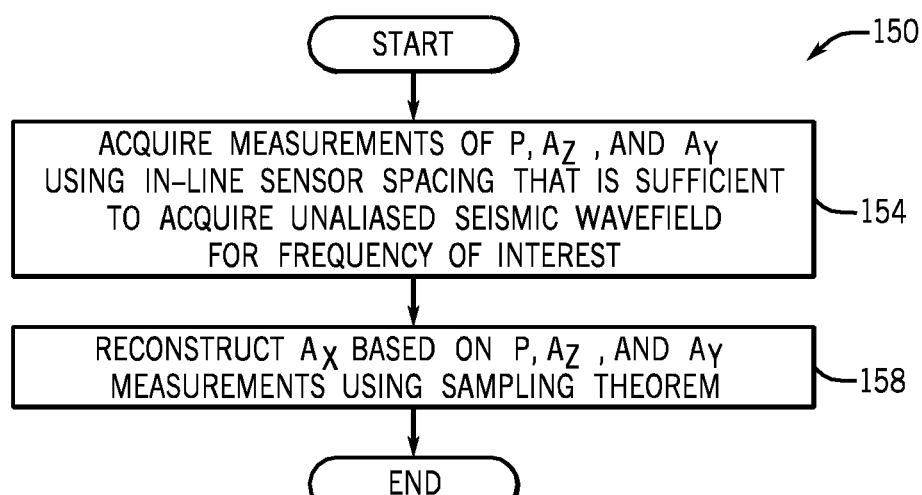

It follows that the measurement of the in-line component of the particle motion vector may be exactly reconstructed from a relatively finely-spaced pressure measurements. Therefore, a 4C streamer may be effectively realized from 3C measurements by measuring the pressure and the cross-line and vertical components of the particle motion vector, as set forth in block 154 in technique 150 that is set forth in FIG. 3. The in-line sampling spacing for the hydrophones is sufficient to allow acquisition of an unaliased seismic wavefield at the frequency band of interest. From the measurements, the in-line particle acceleration $A_x$ may then be reconstructed based on the P, $A_z$ and $A_y$ measurements using the sampling theorem, pursuant to block 158 of the technique 150.

Figure 4:
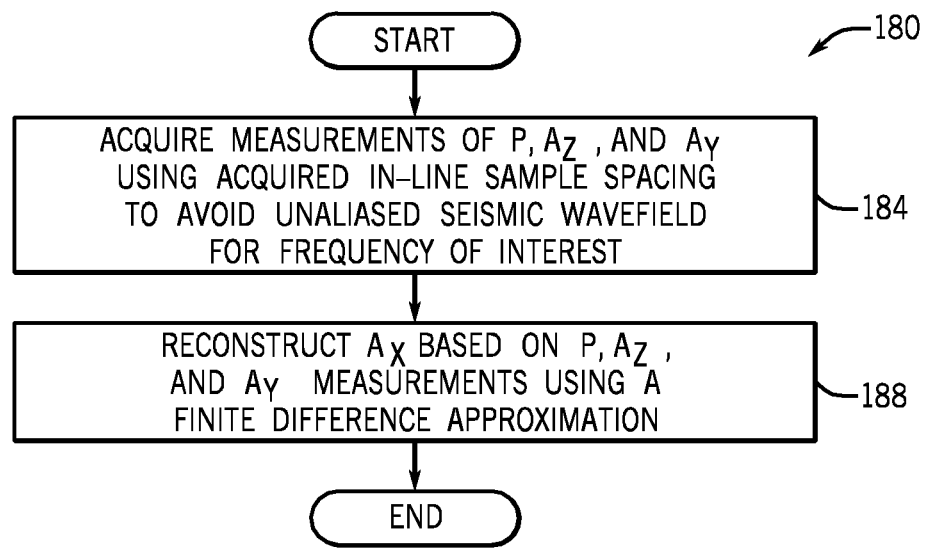
Figure 5:
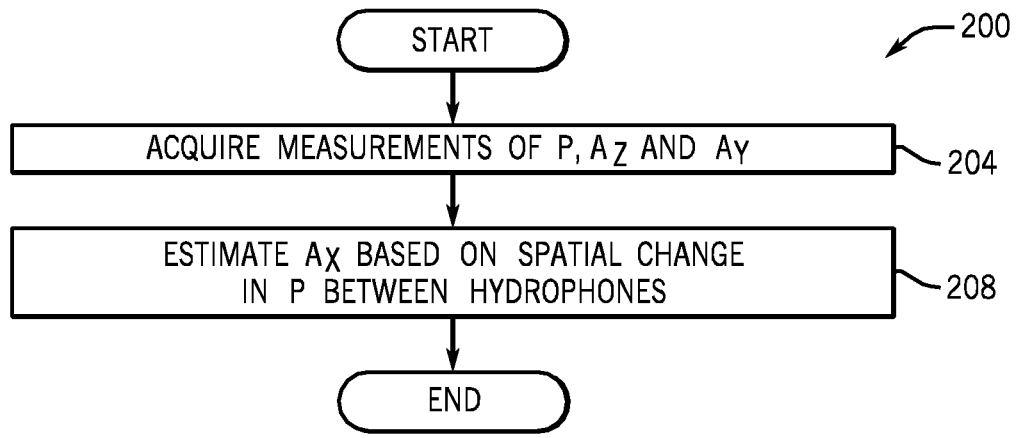

Other variations are contemplated and are within the scope of the appended claims. For example, rather than using the Shannon reconstruction formula that is set forth in Eq. 9, the in-line gradient of the pressure data may be estimated using finite difference approximation. Thus, referring to FIG. 4, in accordance with some implementations, a technique 180 includes acquiring measurements of the pressure P, vertical particle acceleration $A_z$ and cross-line particle acceleration $A_y$, pursuant to block 184; and reconstructing the in-line particle acceleration $A_x$ based on the pressure P, vertical particle acceleration $A_z$ and cross-line particle acceleration $A_y$ measurements using a finite difference approximation. In this manner, the in-line gradient may be estimated using two closely-spaced hydrophones. Thus, referring to FIG. 5, a technique includes acquiring measurements (block 204) pressure P, vertical particle acceleration $A_z$ and cross-line particle acceleration $A_y$, pursuant to block 204 and estimating (block 208) the in-line particle acceleration $A_x$ based on a spatial change in the pressure measurement P between hydrophones.

Figure 6:
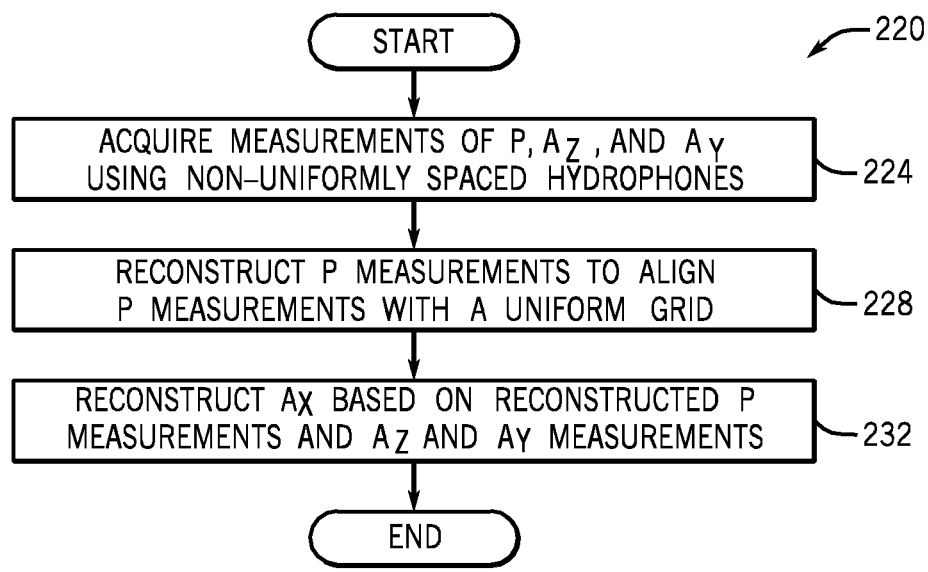

As another variation, the hydrophones may be non-uniformly spaced. In other words, the pressure measurements may not conform to a uniform grid. In accordance with some implementations, the pressure measurements may be reconstructed using a non-uniform reconstruction algorithm to generate another set of data indicative of the pressure P measurements which conform to a uniform grid. As non-limiting examples, the reconstruction algorithm may be the one described by J. L. Yen in an article entitled, "Non-Uniform Sampling of Bandwidth-Limited Signals." IRE Trans. Circuit Theory, CT-3 251-257 (1956), or the reconstruction algorithm may be the one disclosed in U.K. Patent Application No. 0714404.4, entitled, "METHOD OF REPRESENTING SIGNALS,", which was filed on Jun. 13, 2007. Thus, pursuant to a technique 220 that is set forth in FIG. 6, measurements of the pressure measurement P, the vertical particle acceleration $A_z$ and cross-line particle acceleration $A_y$ may be acquired (block 224) using non-uniformly spaced hydrophones. The pressure measurements are then reconstructed (block 228) to align the pressure measurements P with a uniform grid. In-line particle acceleration $A_x$ may then be reconstructed (block 232) based on the reconstructed pressure measurements P, the vertical particle acceleration $A_z$ and cross-line particle acceleration $A_y$, as set forth in block 232.

As yet another variation, the techniques and systems that are disclosed herein may likewise be applied to seismic acquisitions other than towed marine acquisitions. As a non-limiting example, the techniques and systems that are disclosed herein may be applied to a borehole seismic acquisition. In this manner, a cable containing particle motion and pressure sensors may be disposed in a borehole, and the cable may be oriented vertically, obliquely or horizontally, depending on the particular well geometry. Regardless of the orientation, the systems and techniques that are disclosed herein may be used to estimate the axial component of the wavefield using the pressure gradient and the particle motion components that are perpendicular to the axis of the cable. After being scaled together, the data may be rotated to any orientation.

Figure 7:
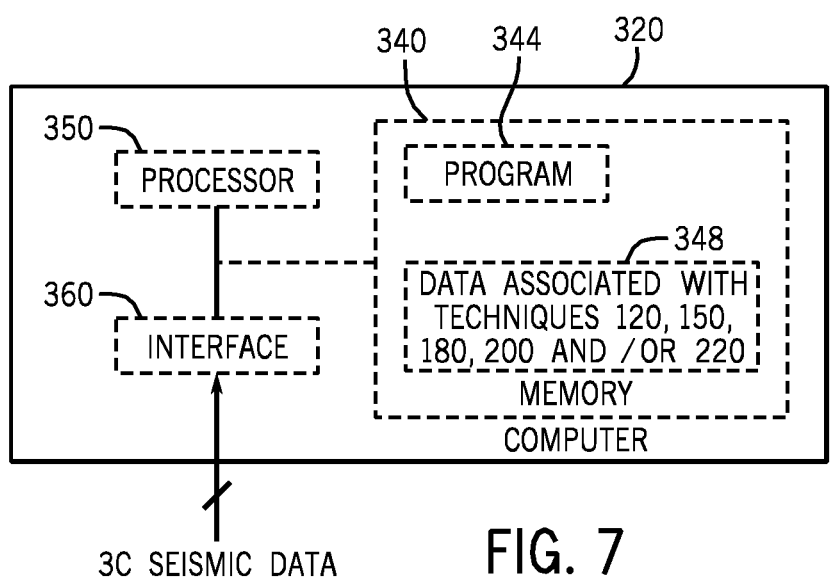
FIG. 7 is a schematic diagram of a data processing system according to an embodiment of the invention.

Referring to FIG. 7, in accordance with some embodiments of the invention, a data processing system 320, or computer, may contain a processor 350 for purposes of processing acquired 3C seismic data for purposes of performing at least one or more the techniques that are disclosed herein to derive 4C data. Moreover, the data processing system 320 may further be used for purposes of processing the 4C data for purposes of performing a geophysical processing operation that is based on 4C data.

In accordance with some embodiments of the invention, the processor 350 may be formed from one or more microprocessors and/or microprocessor processing cores. As non-limiting examples, the processor 350 may be disposed on a streamer 30 (see FIG. 1), located on the vessel 20 (see FIG. 1), located at a land-based processing facility, disposed at a well site in which a sensor cable is deployed in a well, etc., depending on the particular embodiment of the invention. Moreover, the data processing system 320 may be a distributed processing system, in accordance with some embodiments of the invention.

As depicted in FIG. 7, the processor 350 may be coupled to a communication interface 360 for purposes of receiving 3C seismic data. As examples, the communication interface 360 may be a Universal Serial Bus (USB) interface, a network interface, a removable media interface (a flash card, CD-ROM interface, etc.) or a magnetic storage interface (IDE or SCSI interfaces, as non-limiting examples). Thus, the communication interface 360 may take on numerous forms, depending on the particular embodiment of the invention.

In accordance with some embodiments of the invention, the processor 350 is coupled to a memory 340, which stores program instructions 344, which when executed by the processor 350, may cause the processor 350 to perform various tasks of one or more of the techniques that are disclosed herein, such as the techniques 120, 150, 180, 200 and/or 220, as non-limiting examples. It is noted that the memory 340 is a non-transitory memory and may take on numerous forms, such as semiconductor storage, magnetic storage, optical storage, phase change memory storage, capacitor-based storage, etc., depending on the particular implementation. Furthermore, the memory 340 may be formed from more than one of these non-transitory memories, in accordance with some embodiments of the invention. When executing the program instruction 344, the processor 340 may also, for example, store preliminary, intermediate and/or final results obtained via the execution of the program instructions 344 as data 348 in the memory 340.

It is noted that the data processing system 320 is merely an example of one out of many possible architectures for processing the seismic data in accordance with the techniques that are disclosed herein. Moreover, the data processing system 320 is represented in a simplified form, as the processing system 320 may have various other components (a display to display initial, intermediate or final results of the system's processing, as a non-limiting example), as can be appreciated by the skilled artisan. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving first data indicative of pressure measurements and measurements of components of a particle motion vector acquired by sensors disposed on at least one cable, the components comprising at least a cross-line component relative to a direction in which the at least one cable extends;
processing the first data on a machine to construct an in-line component of the particle motion vector based at least in part on the cross-line component of the particle motion vector and the pressure measurements, the in-line component being represented by second data and the in-line component being associated with the direction in which the at least one cable extends; and
processing the first and second data in a geophysical processing operation that relies on at least three components of the particle motion vector.

2. The method of claim 1, wherein the receiving comprises receiving first data indicative of pressure and acceleration components, and the act of processing the first data to generate the second data comprises reconstructing an in-line component of acceleration.

3. The method of claim 1, wherein the act of processing the first and second data comprises performing at least one of the following operations: deghosting, polarization analysis; and rotation of particle motion measurements into a given coordinate system.

4. The method of claim 1, wherein the sensors are spaced apart along at least one cable of said at least one cable pursuant to an in-line spacing that allows acquisition of an unaliased seismic wavefield for a given frequency band, and the processing to generate the second data comprises applying a sampling theorem to construct the in-line component of the particle motion vector.

5. The method of claim 1, wherein the act of processing the first data to generate the second data comprises constructing the in-line component of the particle motion vector based on gradients of the pressure measurements.

6. The method of claim 1, wherein the pressure measurements are associated with locations of a non-uniform sensor grid, and the act of processing the first data to generate the second data to comprises associating the pressure measurements with locations of a uniform sensor grid.

7. The method of claim 1, wherein the act of receiving the first data comprises receiving the data indicative of measurements acquired by a plurality of sensors disposed on at least one streamer or a plurality of sensors disposed on at least one wellbore deployed cable.

8. A system comprising:
an interface to receive first data indicative of a pressure measurement and measurements of components of a particle motion vector acquired by sensors disposed on at least one cable, the components comprising at least a cross-line component relative to a direction in which the at least one cable extends; and
a processor to:
process the first data to construct an in-line component of the particle motion vector based at least in part on the cross-line component of the particle motion vector and the pressure measurements, the in-line component being represented by second data and the in-line component being associated with the direction in which the at least one cable extends; and
process the first and second data in a geophysical processing operation that relies on at least three components of the particle motion vector.

9. The system of claim 8, wherein the processor is further adapted to process the first and second data to perform a four component-based geophysical processing operation that relies on at least three components of the particle motion vector.

10. The system of claim 8, wherein the four component-based geophysical processing operation comprises at least one of a deghosting operation, a polarization analysis and a rotation of particle motion data into a given coordinate system.

11. The system of claim 8, wherein the particle motion vector comprises an acceleration vector.

12. The system of claim 8, wherein the sensors are spaced apart along at least one cable of said at least one cable pursuant to an in-line spacing that allows acquisition of an unaliased seismic wavefield for a given frequency band, and the processor is adapted to apply a sampling theorem to generate the second data.

13. The system of claim 8, wherein the processor is adapted to generate the second data based on gradients of the pressure measurements.

14. The system of claim 8, wherein the pressure measurements are associated with locations of a non-uniform sensor grid, and the processor is adapted to perform interpolation to associate pressure measurements with locations of a uniform sensor grid.

15. The system of claim 8, wherein the first data comprises data indicative of measurements acquired by a plurality of sensors disposed on at least one streamer or a plurality of sensors disposed on at least one wellbore deployed cable.

16. An article comprising a processor readable storage medium storing instructions that when executed by at least one processor cause said at least one processor to:
receive first data indicative of a pressure measurement and measurements of components of a particle motion vector acquired by sensors disposed on at least one cable, the components comprising at least a cross-line component relative to a direction in which the at least one cable extends;
process the first data to construct an in-line component of the particle motion vector based at least in part on the cross-line component of the particle motion vector and the pressure measurements, the in-line component being represented by second data, and the in-line component being associated with the direction in which the cable extends; and
process the first and second data in a geophysical processing operation that relies on at least three components of the particle motion vector.

17. The article of claim 16, the storage medium storing instructions that when executed by said at least one processor cause said at least one processor to:
perform a four component-based geophysical processing operation based on the first and second data.

18. The article of claim 16, the storage medium storing instructions that when executed by said at least one processor cause said at least one processor to:
apply a sampling theorem to generate the second data.

19. The article of claim 16, the storage medium storing instructions that when executed by said at least one processor cause said at least one processor to generate the second data based on gradients of the pressure measurements.

20. The article of claim 16, wherein the pressure measurements are associated with locations of a non-uniform sensor grid, and the storage medium storing instructions that when executed by said at least one processor cause said at least one processor to generate data indicative of pressure measurements associated with locations of a uniform sensor grid.

* * * * *